US011416768B2

(12) United States Patent
Luo et al.

(10) Patent No.: US 11,416,768 B2
(45) Date of Patent: Aug. 16, 2022

(54) FEATURE PROCESSING METHOD AND FEATURE PROCESSING SYSTEM FOR MACHINE LEARNING

(71) Applicant: THE FOURTH PARADIGM (BEIJING) TECH CO LTD, Beijing (CN)

(72) Inventors: Yuanfei Luo, Beijing (CN); Weiwei Tu, Beijing (CN)

(73) Assignee: THE FOURTH PARADIGM (BEIJING) TECH CO LTD, Beijing (CN)

( * ) Notice: Subject to any disclaimer, the term of this patent is extended or adjusted under 35 U.S.C. 154(b) by 624 days.

(21) Appl. No.: 16/335,562

(22) PCT Filed: Jun. 19, 2017

(86) PCT No.: PCT/CN2017/088964
§ 371 (c)(1),
(2) Date: Mar. 21, 2019

(87) PCT Pub. No.: WO2018/059016
PCT Pub. Date: Apr. 5, 2018

(65) Prior Publication Data
US 2020/0019881 A1 Jan. 16, 2020

(30) Foreign Application Priority Data
Sep. 27, 2016 (CN) .......................... 201610857425.3

(51) Int. Cl.
*G06N 20/00* (2019.01)
*G06F 17/18* (2006.01)
(52) U.S. Cl.
CPC ............. *G06N 20/00* (2019.01); *G06F 17/18* (2013.01)

(58) Field of Classification Search
CPC .................................. G06F 17/18; G06N 20/00
See application file for complete search history.

(56) References Cited

U.S. PATENT DOCUMENTS

2004/0215430 A1  10/2004  Huddleston et al.
2007/0123773 A1  5/2007  Fuchs et al.
(Continued)

FOREIGN PATENT DOCUMENTS

CN      1864153 A    11/2006
CN    101276060 A    10/2008
(Continued)

OTHER PUBLICATIONS

"Notification of Granting of Patent Right to Invention" for Chinese application No. 201610880712.6, dated Jul. 24, 2020.
(Continued)

*Primary Examiner* — Roy Y Yi
*Assistant Examiner* — Geoffrey T Evans
(74) *Attorney, Agent, or Firm* — Novick, Kim & Lee, PLLC; Sang Ho Lee; Hyun Woo Shin (57) ABSTRACT

Provided are a feature processing method and feature processing system for machine learning. The feature processing method includes: (A) acquiring a data record, wherein the data record comprises at least one piece of attribute information; (B) for each of the continuous features generated based on at least a some of the attribute information in the at least one piece of attribute information, executing a basic binning operation and at least one additional operation to generate a basic binning feature and at least one additional feature corresponding to each of the continuous features; and (C) generating a machine learning sample at least comprising the generated basic binning feature and at least one additional feature. By means of the above-mentioned method, a plurality of features comprising the binning (Continued)

feature and corresponding to the continuous features can be acquired, so as to make the features constituting the machine learning sample more effective, so as to improve the effect of a machine learning model.

19 Claims, 5 Drawing Sheets

(56) References Cited

U.S. PATENT DOCUMENTS

| | | |
|---|---|---|
| 2014/0279742 A1 | 9/2014 | Forman |
| 2015/0379428 A1 | 12/2015 | Dirac et al. |
| 2016/0081637 A1* | 3/2016 | Noshi .................. G01T 1/2985 378/5 |
| 2016/0239528 A1 | 8/2016 | Pemberton et al. |
| 2016/0247502 A1 | 8/2016 | Park et al. |

FOREIGN PATENT DOCUMENTS

| | | | |
|---|---|---|---|
| CN | 102227121 A | 10/2011 | |
| CN | 104702492 A | 6/2015 | |
| CN | 104778176 A | 7/2015 | |
| WO | WO-03090147 A2 * | 10/2003 | ............. G06Q 10/10 |

OTHER PUBLICATIONS

"The Second Office Action" for Chinese application No. 201610880712.6, dated Apr. 3, 2020.

\* cited by examiner

FIG. 7

FEATURE PROCESSING METHOD AND FEATURE PROCESSING SYSTEM FOR MACHINE LEARNING

TECHNICAL FIELD

The present invention generally relates to a field of artificial intelligence, and more particularly to a feature processing method and a feature processing system for machine learning.

BACKGROUND

With the occurrence of massive data, artificial intelligence technology has been developed rapidly, and in order to mine value from a large amount of data, it is required to generate a sample suitable for machine learning based on data records.

Here, each data record may be regarded as description about an event or an object, which corresponds to an example or an instance. Various items that reflect performance or property of the event or the object in a certain aspect are included in the data record, which may be called as "attributes".

It is very likely to have a great impact on effect of a machine learning model that how respective attributes of an original data record are transformed into features of a machine learning sample. For example, in the field of image or audio signal processing, the features are often processed into a histogram according to local blocks in a frequency domain (for example, US Patent Application No. US20160247502A1, US Patent Application No. US20160239528A1, and Chinese Patent No. CN101276060, etc.). On one hand, this kind of classical processing method relies on inherent characteristics of an image or audio signal, and a single histogram division method is generally adopted without a corresponding supplement in the prior art. On the other hand, in many practical application scenarios, an inherent law of data is difficult to be as obvious as that of the image or audio signal, therefore, it is not possible to effectively capture an appropriate histogram division, for example, the features extracted according to a traditional binning method may easily make the machine learning model unstable, that is to say, prediction effect of a same model with respect to a same data differs a lot under different binning modes and learning effect is very dependent on selection of the number of bins, which significantly increases workload of parameter adjustment for the model and also makes the model difficult to achieve the best effect.

In fact, the prediction effect of the machine learning model is related to selection of the model, available data, and extraction of the feature and so on. That is to say, on one hand, the prediction effect of the model may be improved by improving the method of feature extraction, and on the other hand, if the feature extraction is not appropriate, the prediction effect will be deteriorated.

However, in a process of determining the method of the feature extraction, it is often necessary for a technician to not only master the knowledge of the machine learning, but also to have an in-depth understanding of an practical prediction problem, however, the prediction problem is often related to different practical experiences of different industries, which makes it difficult to achieve a satisfactory effect.

SUMMARY

Exemplary embodiments of the present invention are intended to overcome a drawback that it is difficult for an existing feature processing method to achieve a satisfactory machine learning effect.

According to an exemplary embodiment of the present invention, a feature processing method for machine learning is provided, the feature processing method comprising: (A) acquiring a data record comprising at least one attribute information; (B) performing a basic binning operation and at least one additional operation with respect to each of continuous features generated based on at least a portion of the at least one attribute information, to generate a basic binning feature and at least one additional feature corresponding to the each of the continuous features; and (C) generating a machine learning sample at least comprising the generated basic binning feature and the at least one additional feature.

According to another exemplary embodiment of the present invention, a feature processing system for machine learning is provided, the feature processing system comprising: a data record acquisition device configured to acquire a data record comprising at least one attribute information; a feature generation device configured to perform a basic binning operation and at least one additional operation with respect to each of continuous features generated based on at least a portion of the at least one attribute information, to generate a basic binning feature and at least one additional feature corresponding to the each of the continuous features; and a machine learning sample generation device configured to generate a machine learning sample at least comprising the generated basic binning feature and at least one additional feature.

According to another exemplary embodiment of the present invention, a computing device for performing feature processing for machine learning is provided, the computing device comprising a storage component in which a set of computer-executable instructions is stored, and a processor, wherein when the set of the computer-executable instructions is executed by the processor, following steps are performed: (A) acquiring a data record comprising at least one attribute information; (B) performing a basic binning operation and at least one additional operation with respect to each of continuous features generated based on at least a portion of the at least one attribute information, to generate a basic binning feature and at least one additional feature corresponding to the each of the continuous features; and (C) generating a machine learning sample at least comprising the generated basic binning feature and at least one additional feature.

In the feature processing method and the feature processing system for machine learning according to an exemplary embodiment of the present invention, in addition to the basic binning operation, the additional operation is further performed for a single continuous feature, thereby obtaining a plurality of features including the binning feature corresponding to the continuous feature, so that the features constituting the machine learning sample are more effective, thereby improving the effect of the machine learning model.

BRIEF DESCRIPTION OF THE DRAWINGS

These and/or other aspects and advantages of the present invention will become more apparent and be more easily understood from the following detailed description of the embodiments of the invention, taken in conjunction with the accompanying drawings.

DETAILED DESCRIPTION

In order for those skills in the art to better understand the present invention, exemplary embodiments of the present invention are further described in detail in conjunction with the accompanying drawings and specific embodiments below.

In an exemplary embodiment of the present invention, a feature processing is performed by: performing a binning operation and additional other operations on a single continuous feature to generate a plurality of features corresponding to the single continuous feature, and placing all the features generated as above into a machine learning sample, thereby making the generated machine learning sample more suitable for machine learning, so that a better prediction result may be obtained.

Here, the machine learning is an inevitable outcome of the development of artificial intelligence research to a certain stage, which is dedicated to improving the performance of a system itself using experience by means of calculation. In a computer system, "experience" usually exists in a form of data" and a "model" may be generated from the data through a machine learning algorithm. That is to say, if experience data is provided to the machine learning algorithm, the model can be generated based on these experience data, and in the face of a new situation, the model will provide a corresponding judgment, that is, the prediction result. No matter training a machine learning model or using the trained machine learning model to make a prediction, the data needs to be transformed into the machine learning sample including various features. The machine learning may be implemented in a form of "supervised learning", "unsupervised learning" or "semi-supervised learning". It should be noted that the present invention does not impose any particular limitation on a specific machine learning algorithm. In addition, it should be noted that other means such as a statistical algorithm and so on may be combined in a process of training and applying the model.

Figure 1:
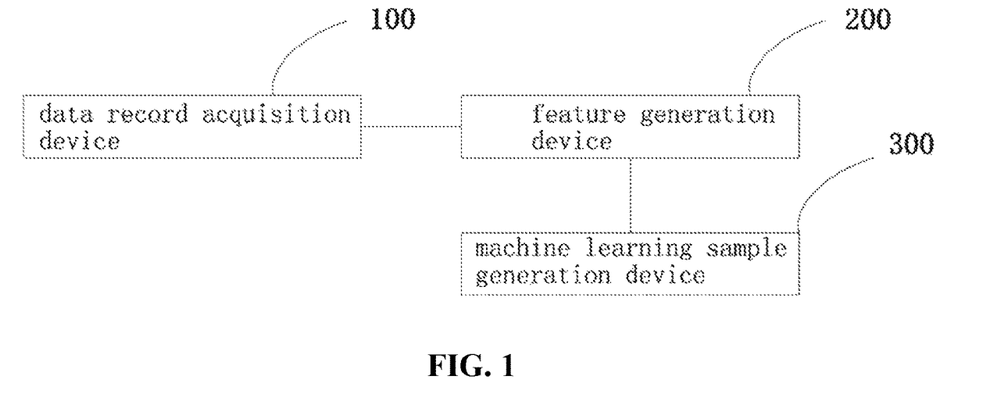
FIG. 1 illustrates a block diagram of a feature processing system for machine learning according to an exemplary embodiment of the present invention.

FIG. 1 illustrates a block diagram of a feature processing system for the machine learning according to an exemplary embodiment of the present invention. Specifically, the feature processing system performs simultaneously the binning operation and an additional function operation for each continuous feature respectively, thus, a plurality of corresponding operation features may be obtained with respect to the single continuous feature, so that it is possible to characterize original data record from different aspects, scales/levels simultaneously, and furthermore, to form the machine learning sample based on the obtained features. The system illustrated in FIG. 1 may be implemented in software entirely through a computer program, may be implemented in a special hardware device, and may also be implemented in a combination of software and hardware. Correspondingly, respective device constituting the system illustrated in FIG. 1 may be a virtual module that implements a corresponding function by the computer program, may be a general-purpose or dedicated device that implements the function by a hardware structure, or may also be a processor that executes corresponding computer programs, and the like. With the system, it is possible to generate the machine learning sample that help to improve machine learning effect (for example, model stability, etc.).

As illustrated in FIG. 1, a data record acquisition device 100 is configured to acquire a data record including at least one attribute information.

The above data record may be data generated online, data generated in advance and stored, or data received from the outside through an input device or a transmission medium. These data may relate to information of an individual, an enterprise, or an organization, for example, information such as identity, education, occupation, asset, contact method, liability, income, earning, tax, etc. Alternatively, the data may also relate to information of business related items, such as information about the transaction amount of a sale and purchase contract, parties of the transaction, a subject matter, a place of the transaction, and the like. It should be noted that content of the attribute information mentioned in exemplary embodiments of the present invention may relate to performance or property of any object or thing in a certain aspect, and is not limited to define or describe an individual, a substance, an organization, an unit, an institution, an item, an event, and the like.

The data record acquisition device 100 may acquire structured or unstructured data from different sources, for example text data or numerical data, and the like. The acquired data record may be used to form the machine learning sample so as to participate in a training/prediction process of the machine learning. These data may come from inside of an entity wants to acquire the prediction result of the model, for example, from a bank, an enterprise, a school, etc. that wants to acquire the prediction result; these data may also come from outside of the above-described entities, for example, from a data provider, Internet (for example, a social network site), a mobile operator, an APP operator, a courier company, a credit agency, etc. Alternatively, the above internal data and external data may be used in combination to form the machine learning sample carrying more information.

The above data may be input to the data record acquisition device 100 through the input device, or may be automatically generated by the data record acquisition device 100 based on existing data, or may be obtained from the network (for example, a storage medium (for example, a data warehouse) on the network) by the data record acquisition device 100, in addition, an intermediate data exchange device such as a server can facilitate the data record acquisition device 100 to acquire corresponding data from an external data source. Here, the acquired data can be converted into a format that is easy to be processed, by a data conversion module such as a text analysis module in the data record acquisition device 100. It should be noted that the data record acquisition device 100 may be configured as respective modules consisting of software, hardware, and/or firmware, some or all of which may be integrated or co-operated to accomplish a particular function.

A feature generation device 200 is configured to perform a basic binning operation and at least one additional operation with respect to each of continuous features generated based on at least a portion of the at least one attribute information, to generate a basic binning feature and at least one additional feature corresponding to the each of the continuous features.

Here, with respect to a part of the attribute information of the data record, a corresponding continuous feature may be generated. Here, the continuous feature is a feature opposite to a discrete feature (for example, a category feature), and a value thereof may be the value having a certain continuity, for example, distance, age, amount, etc. In contrast, as an example, the value of the discrete feature does not have the continuity. For example, it may be the feature classified without an order such as "from Beijing", "from Shanghai" or "from Tianjin", "gender is male", "gender is female", etc.

For example, the feature generation device 200 may directly use a certain attribute with a continuous value in the data record as a corresponding continuous feature in the machine learning sample. For example, attribute such as the distance, the age, and the amount may be directly used as the corresponding continuous feature. In addition, the feature generation device 200 may also process certain attributes (for example, continuous attributes and/or discrete attributes) in the data record to obtain the corresponding continuous feature, for example, use the ratio of height to weight as the corresponding continuous feature.

It should be noted that in addition to the continuous features that will be subjected to the basic binning and the additional operations, the feature generation device 200 may also generate other continuous features and/or discrete features of the machine learning sample that may participate in the training and/or prediction of the model without being subjected to the above operations. Alternatively, these features without being subjected to the above operations may also be generated by another feature generation device (not shown).

For each continuous feature subjected to the basic binning operation, the feature generation device 200 may further additionally perform at least one additional operation, thus it is possible to simultaneously obtain a plurality of features characterizing certain attributes of the original data record from different aspects, scales/levels.

Here, the binning operation refers to a specific way of discretizing the continuous feature, that is, dividing a value domain of the continuous feature into a plurality of sections (i.e., a plurality of bins), and determining a corresponding binning feature value based on the divided bins. The binning operation may be generally classified into supervised binning and unsupervised binning. Each of these two types includes some specific binning modes. For example, the supervised binning includes a minimum entropy binning, a minimum description length binning, etc. and the unsupervised binning includes an equal-width binning, an equal-depth binning, a k-means clustering based binning and so on. In each binning mode, a corresponding binning parameter, for example width, depth and so on, may be set. It should be noted that, according to an exemplary embodiment of the present invention, the binning operation performed by the feature generation device 200 does not limit the kind of the binning mode or the parameter of the binning operation, and a specific representation manner of the binning feature generated correspondingly is also not limited.

In addition to performing the basic binning operation, the feature generation device 200 may perform at least one additional operation on each of the continuous features. Here, the additional operation may be an arbitrary function operation that may generate the continuous feature or the discrete feature, for example, the additional operation may be a logarithmic operation, an exponential operation, an absolute value operation, and the like. In particular, the additional operation may also be the binning operation (referred to as "additional binning operation"), where the additional binning operation differs from the basic binning operation in the binning mode and/or the binning parameters. It can be seen that the at least one additional operation may be operations with the same type but with different operation parameters (for example, an index in the exponential operation, a base in the logarithmic operation, a depth in the binning operation, a width in the binning operation, etc.), and may also be different types of operations, or it may be this case where a part of the additional operations may be the same type of operations (the part of the operations with the same type need to have different operation parameters), here, the additional operation may be an expression operation taking the logarithmic operation, the exponential operation, the absolute value operation, etc. as a main body, and may also be a combination of a plurality of operations.

By the above manner, the feature generation device 200 may convert each of at least a part of the continuous features into the basic binning feature and at least one corresponding additional feature, thereby improving effectiveness of machine learning materials so as to provide a good basis for the training/prediction of the machine learning model.

A machine learning sample generation device 300 is configured to generate the machine learning sample at least including the generated basic binning feature and at least one additional feature. That is to say, in the machine learning sample generated by the machine learning sample generation device 300, the basic binning feature and the additional feature generated by the feature generating device 200 are included, and further, as an alternative, the machine learning sample may further include any other feature, such as a non-continuous feature generated based on attribute information of the data record, the continuous feature without being subjected to the binning operation or the additional operation, and/or the continuous feature subjected to the binning operation and the additional operation. As described above, as an example, these other features may be generated by feature generation device 200 or by another device.

It should be noted that the system illustrated in FIG. 1 is used to generate the machine learning sample, and such a system may exist independently. Here, it should be noted that the manner in which the system acquires the data record is not limited, that is to say, as an example, the data record acquisition device 100 may be a device having the ability to receive and process the data record, or may simply be a device that provides the data record that has been well prepared.

In addition, the system illustrated in FIG. 1 may also be integrated into a system for the training or prediction of the model as a part for completing feature processing.

Figure 2:
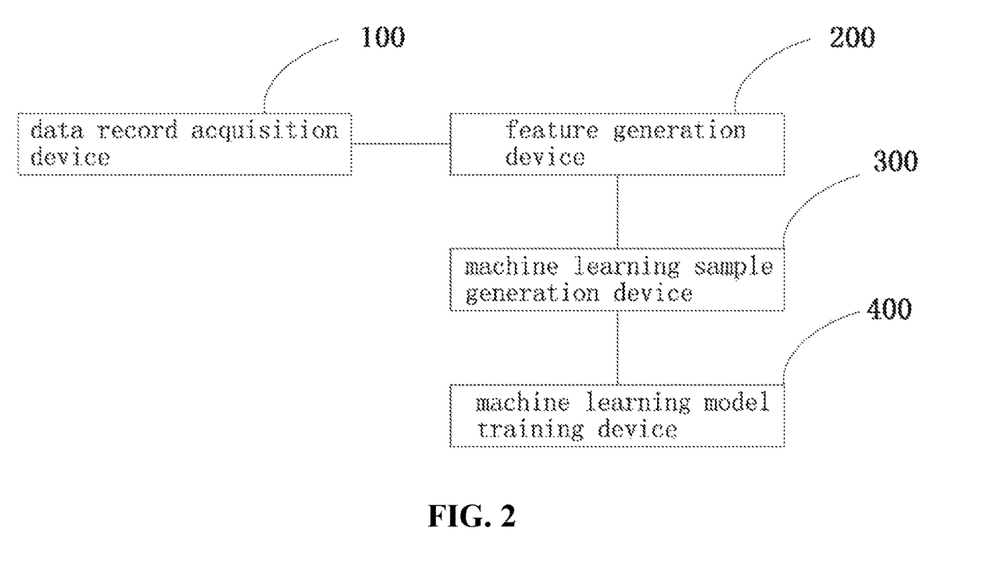
FIG. 2 illustrates a block diagram of a training system of a machine learning model according to an exemplary embodiment of the present invention.

FIG. 2 shows a block diagram of a training system of the machine learning model according to an exemplary embodiment of the present invention. In the system illustrated in FIG. 2, in addition to the data record acquisition device 100, the feature generation device 200, and the machine learning sample generation device 300 described above, a machine learning model training device 400 is also included.

In particular, in the system illustrated in FIG. 2, the data record acquisition device 100 and the feature generation device 200 may operate in the manner as that in the system illustrated in FIG. 1. Furthermore, the machine learning sample generation device 300 may generate a machine learning training sample, in particular, as an example, in the case of supervised learning, the machine learning training sample generated by the machine learning sample generation device 300 may include two parts of a feature part and a label part.

The machine learning model training device 400 is configured to train the machine learning model based on the machine learning training sample. Here, the machine learning model training device 400 may learn an appropriate machine learning model from the machine learning training samples using an appropriate machine learning algorithm (for example, logarithmic probability regression).

In the above example, the machine learning model which is stable and has a good prediction effect may be trained.

Figure 3:
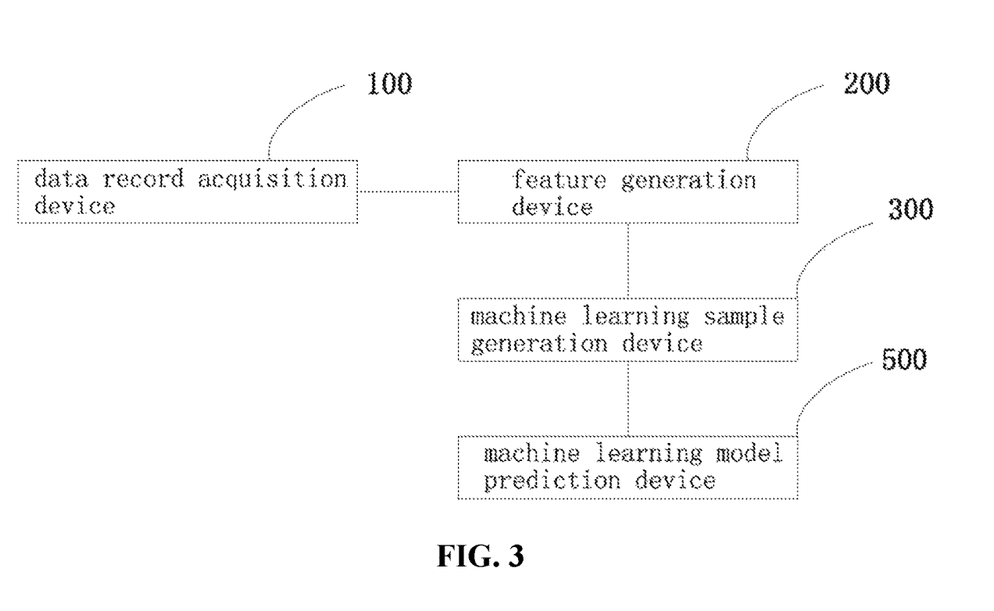
FIG. 3 illustrates a block diagram of a prediction system of the machine learning model according to an exemplary embodiment of the present invention.

FIG. 3 illustrates a block diagram of a prediction system of the machine learning model according to an exemplary embodiment of the present invention. In the system illustrated in FIG. 3, in addition to the data record acquisition device 100, the feature generation device 200, and the machine learning sample generation device 300 described above, a machine learning model prediction device 500 is also included.

Specifically, in the system illustrated in FIG. 3, the data record acquisition device 100 and the feature generation device 200 may operate in the manner in the system illustrated in FIG. 1. Further, the machine learning sample generation device 300 may generate a machine learning prediction sample.

The machine learning model prediction device 500 is configured to provide a prediction result corresponding to the machine learning prediction sample using the machine learning model. Here, the machine learning model prediction device 500 may provide prediction results in batches with respect to a plurality of machine learning prediction samples.

Here, it should be noted that the systems of FIG. 2 and FIG. 3 may also be efficiently fused to form a system that is capable of accomplishing both the training and the prediction of the machine learning model.

Figure 4:
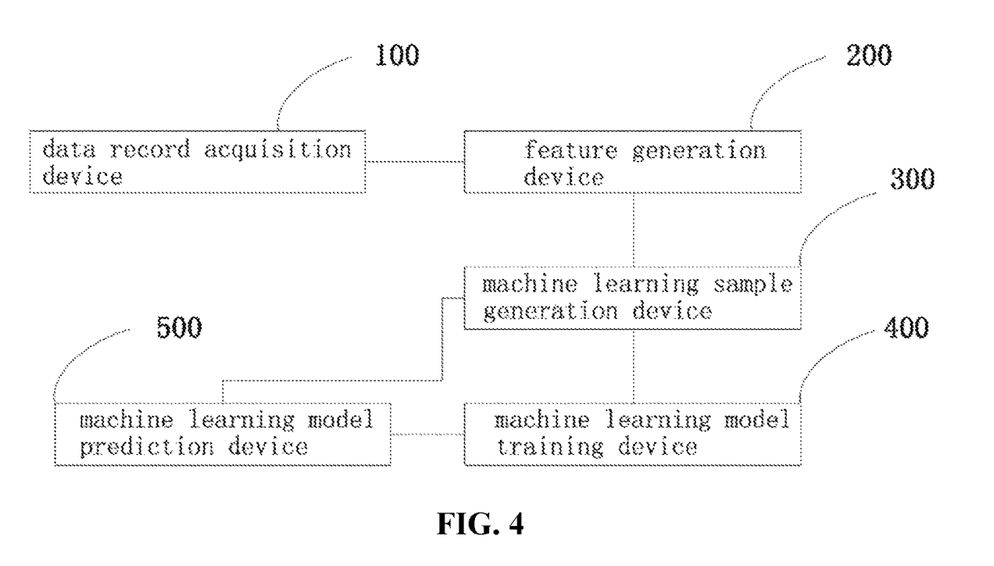
FIG. 4 illustrates a block diagram of a training and prediction system of the machine learning model according to another exemplary embodiment of the present invention.

In particular, FIG. 4 illustrates a block diagram of a training and prediction system of the machine learning model according to an exemplary embodiment of the present invention. The data record acquisition device 100, the feature generation device 200, the machine learning sample generation device 300, the machine learning model training device 400, and the machine learning model prediction device 500 described above are included in the system illustrated in FIG. 4.

Here, in the system illustrated in FIG. 4, the data record acquisition device 100 and the feature generation device 200 may operate in the manner as that in the system illustrated in FIG. 1. Furthermore, the machine learning sample generation device 300 may generate the machine learning training sample or the machine learning prediction sample in accordance with situations. Specifically, in a model training phase, the machine learning sample generation device 300 may generate the machine learning training sample, in particular, as an example, in the case of the supervised learning, the machine learning training sample generated by the machine learning sample generation device 300 may include both portions of the feature and the label. Moreover, in a model prediction phase, the machine learning sample generation device 300 may generate the machine learning prediction sample. Here, it should be understood that a feature portion of the machine learning prediction sample is consistent with the feature portion of the machine learning training sample.

Furthermore, in the model training phase, the machine learning sample generation device 300 provides the generated machine learning training sample to the machine learning model training device 400, so that the machine learning model training device 400 trains the machine learning model based on the machine learning training sample. After the machine learning model training device 400 obtains the machine learning model, the machine learning model training device 400 provides the trained machine learning model to the machine learning model prediction device 500. Accordingly, in the model prediction phase, the machine learning sample generation device 300 provides the generated machine learning prediction sample to the machine learning model prediction device 500, so that the machine learning model prediction device 500 provides the prediction result with respect to the machine learning prediction sample using the machine learning model.

It should be understood that the above-described devices may be respectively configured to execute software, hardware, firmware, or any combination thereof for a particular function. For example, these devices may correspond to dedicated integrated circuits, may also correspond to pure software codes, and may also correspond to units or modules in which the software and the hardware are combined. Moreover, one or more of the functions implemented by these devices may also be performed collectively by components in a physical entity device (for example, a processor, a client, or a server, etc.).

A flowchart of a feature processing method for the machine learning according to an exemplary embodiment of the present invention is described below with reference to FIG. 5. Here, as an example, the method illustrated in FIG. 5 may be performed by the feature processing system illustrated in FIG. 1, may also be implemented in software entirely by the computer program, and may also be executed by a computing device with a specific configuration. For convenience of description, it is assumed that the method illustrated in FIG. 5 is performed by the feature processing system illustrated in FIG. 1.

Figure 5:
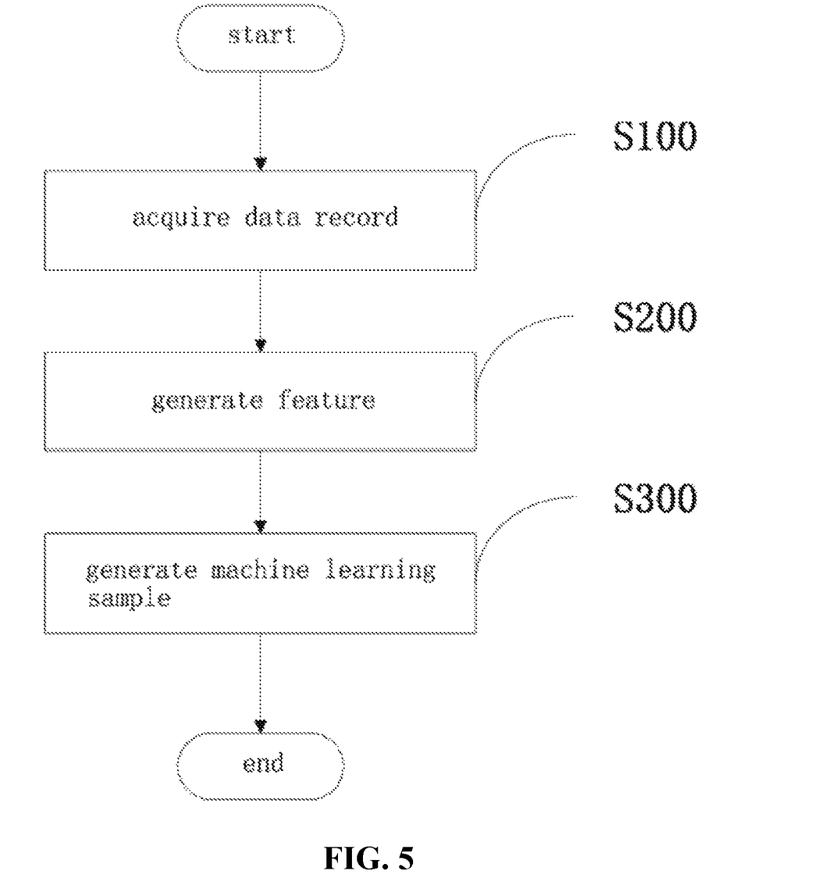
FIG. 5 illustrates a flowchart of a feature processing method for machine learning according to an exemplary embodiment of the present invention.

As illustrated in FIG. 5, in step S100, the data record acquisition device 100 acquires the data record including at least one attribute information.

Here, as an example, the data record acquisition device 100 may collect data by a manual, semi-automatic, or fully automatic manner, or process the collected original data such that the processed data record has an appropriate format or form. As an example, the data record acquisition device 100 may collect data in batches.

Here, the data record acquisition device 100 may receive the data record manually input by the user through an input device (for example, a workstation). In addition, the data record acquisition device 100 may systematically retrieve the data record from a data source in a fully automatic manner, for example, request a data source by a timer mechanism implemented in software, firmware, hardware, or a combination thereof and obtain the requested data in a response. The data source may include one or more databases or other servers. The fully automatic manner of data acquisition may be implemented via an internal network and/or an external network, which may include transmitting encrypted data through the Internet. In the case where the server, the database, the networks, etc. are configured to communicate with each other, data collection may be performed automatically without human intervention, but it should be noted that some user input operation may still exist under this manner. The semi-automatic manner falls between the manual manner and the fully automatic manner. The difference between the semi-automatic manner and the fully automatic manner is that a trigger mechanism activated by a user replaces, for example, the timer mechanism. In this case, in the case where a specific user input is received, a request to retrieve data is generated. Each time the data is acquired, preferably, captured data may be stored in a non-volatile memory. As an example, the data warehouse may be utilized to store the original data collected during the acquisition and the processed data.

The data record acquired above may come from the same or different data sources, that is to say, each data record may also be a concatenation result of different data records. For example, in addition to acquiring information data records (including an attribute information field such as income, education, position, asset status, etc.) that a customer fills in when applying for a credit card to a bank, as an example, the data record acquisition device 100 may further acquire other data records of the customer at the bank, such as a loan record, daily transaction data, etc. These acquired data record may be concatenated into a complete data record. In addition, the data record acquisition device 100 may also acquire data that come from other private sources or public sources, for example, data from the data provider, data from the Internet (for example, the social network site), data from the mobile operator, data from the APP operator, data from the courier company, data from the credit agency, and so on.

Alternatively, the data record acquisition device 100 may store and/or process the collected data by means of a hardware cluster (such as a Hadoop cluster, a Spark cluster and so on), for example, storage, classification, and other offline operations. In addition, the data record acquisition device 100 may also perform on-line stream processing on the collected data.

As an example, the data record acquisition device 100 may include the data conversion module such as the text analysis module. Accordingly, in step S100, the data record acquisition device 100 may convert the unstructured data such as a text into the structured data that is easier to be used, so as to be further processed or referenced later. Text-based data may include an email, a document, a web page, a graphic, a spreadsheet, a call center log, a transaction report, and the like.

Next, in step S200, the feature generation device 200 performs a basic binning operation and at least one additional operation with respect to each of continuous features generated based on at least a portion of the at least one attribute information, to generate a basic binning feature and at least one additional feature corresponding to the each of the continuous features.

In particular, step S200 is intended to generate the basic binning feature and the at least one additional feature that may constitute at least a portion of the features of the machine learning sample. To this end, for a specific continuous feature (which is generated based on at least a portion of the attribute information of the data record), corresponding basic binning feature and additional feature may be obtained by performing the basic binning operation and the additional operation, respectively.

The continuous feature may be generated from at least a portion of the attribute information of the data record. For example, the attribute information such as the distance, the age, and the amount with a continuous value of the data record may be directly used as the continuous feature, and, for example, the continuous feature may be obtained by further processing on certain attribute information of the data record, for example, the ratio of the height to the weight may be used as the continuous feature.

After the continuous feature is obtained, the feature generation device 200 may perform the basic binning operation on the obtained continuous feature, here, the feature generation device 200 may perform the basic binning operation according to various binning modes and/or binning parameters.

Taking an unsupervised equal-width binning as an example, it is assumed that the continuous feature has a value range of [0, 100] and a corresponding binning parameter (for example, the width) is 50, the value range may be divided into two bins. In this case, the continuous feature whose value is 61.5 corresponds to the second bin. If the two bins are numbered as 0 and 1, the bin corresponding to the continuous feature whose value is 61.5 is numbered as 1. Or, it is assumed that a binning width is 10, the value range may be divided into 10 bins. In this case, the continuous feature whose value is 61.5 corresponds to the seventh bin, and if the ten bins are numbered from 0 to 9, the bin corresponding to the continuous feature whose value is 61.5 is numbered as 6. Or, it is assumed that the binning width is 2, the value range may be divided into 50 bins. In this case, the continuous feature whose value is 61.5 corresponds to the 31st box, and if the 50 bins are numbered from 0 to 49, the box corresponding to the continuous feature whose value is 61.5 is numbered as 30.

After mapping the continuous feature to a plurality of bins, a corresponding feature value can be any user-defined value. That is to say, the basic binning operation is performed to generate the basic binning feature with a plurality of dimensions corresponding to each continuous feature, wherein, as an example, each dimension may indicate whether a corresponding continuous feature is assigned into a corresponding bin, for example, "1" indicates that the continuous feature is assigned into the corresponding bin, and "0" indicates that the continuous feature is not assigned into the corresponding bin. Accordingly, in the above example, it is assumed that the value range is divided into 10 bins, the basic binning feature may be a feature with 10 dimensions, and the basic binning feature corresponding to the continuous feature whose value is 61.5 may be expressed as [0,0,0,0,0,0,1,0,0,0]. Or, each dimension may indicate a feature value of the corresponding continuous feature that is assigned into the corresponding bin, and accordingly, in the above example, the basic binning feature corresponding to the continuous feature having the value of 61.5 may be expressed as [0,0,0,0,0,0,61.5,0,0,0]. Or, each dimension indicates an average value of the feature values of all continuous features that are assigned into the corresponding bin; or each dimension indicates an intermediate value of the feature values of all continuous features that are assigned into the corresponding bin; or each dimension indicates a boundary value of the feature values of all continuous features that are assigned into the corresponding bin, and the boundary value herein may be a upper boundary value or a lower boundary value.

In addition, the values of the basic binning feature may be normalized to facilitate execution of the operation. It is assumed that the j-th value of the i-th continuous feature is $x_{ij}$, its binning feature may be expressed as (BinID, $x'_{ij}$), wherein BinID indicates a ordinal number of the bin to which the continuous feature is assigned, and a value range of the ordinal number is 0, 1, . . . , B−1, where B is the total number of the bins, $x'_{ij}$ is the normalized value of $x_{ij}$, and the above feature (BinID, $x'_{ij}$) indicates that the feature value of the dimension corresponding to the bin numbered as BinID in the basic binning feature is $x'_{ij}$ and the feature values of remaining dimensions are 0.

Here, $x'_{ij}$ may be expressed as follows:

$$x'_{ij} = (x_{ij} - \min_i) \times \frac{B}{\max_i - \min_i} - BinID,$$

Where $\max_i$ is the maximum value of the i-th continuous feature, and $\min_i$ is the minimum value of the i-th continuous feature, and $$BinID = \left\lfloor (x_{ij} - \min_i) \times \frac{B}{\max_i - \min_i} \right\rfloor,$$

where $\lfloor \ \rfloor$ is an arithmetic symbol indicating rounding down.

Taking the unsupervised equal-width binning as an example, it is assumed that the continuous feature has the value range of [0, 100], and in the case that the binning width is 50, the continuous feature whose value is 61.5 may correspond to the basic binning feature (1, 0.23) according to the above calculation formula, while in the case that the binning width is 10, the continuous feature whose value is 61.5 may correspond to the basic binning feature (6, 0.15) according to the above calculation formula.

Here, in order to obtain the above feature (BinID, $x'_{ij}$), in step S200, the feature generation device 200 may calculate BinID and $x'_{ij}$ for each $x_{ij}$ value according to the above calculation formula, or the feature generation device 200 may also generate a mapping table about the value range of respective BinID in advance, and obtain the BinID corresponding to the continuous feature by searching the mapping table.

Moreover, as an example, noise in the data record may also be reduced by removing a possible outlier in a data sample before the basic binning operation is performed. In this way, the effectiveness of the machine learning using the binning features may be further improved.

In particular, an outlier bin can be additionally provided so that the continuous feature having an outlier value is assigned into the outlier bin. For example, for the continuous feature with a value range of [0, 1000], a certain number of samples may be selected for pre-binning. For example, the equal-width binning is first performed with the binning width of 10, and the number of samples within each bin is recorded, furthermore, for bins with a small number of samples (for example, less than a threshold), they may be merged into at least one outlier bin. As an example, if the number of samples in the bins at both ends is small, such bins with the small number of samples may be merged into the outlier bin, and the remaining boxes are retained. It is assumed that the number of samples in the bins numbered from 0 to 10 is small, the bins numbered from 0 to 10 may be merged into the outlier bin, and thus the continuous features having the value range of [0,100] are uniformly assigned into the outlier bin.

In addition to performing the basic binning operation described above, in step S200, the feature generation device 200 further performs at least one additional operation different from the basic binning operation with respect to the each continuous feature on which the basic binning operation has been performed, so as to obtain at least one corresponding additional feature.

Here, the additional operation may be an arbitrary function operation which may have corresponding operation parameters, and the additional operation performed with respect to each continuous feature may be one or more operations, wherein the more operations may include different types of operations and may also include operations with the same type but different operation parameters.

In particular, the additional operation may also indicate the binning operation. Here, similar to the basic binning feature, an additional binning feature generated through the additional binning operation may also be the feature with a plurality of dimensions, where each dimension indicates whether a corresponding continuous feature is assigned into a corresponding bin; or each dimension indicates a feature value of the corresponding continuous feature that is assigned into the corresponding bin; or each dimension indicates an average value of the feature values of all continuous features that are assigned into the corresponding bin; or each dimension indicates an intermediate value of the feature values of all continuous features that are assigned into the corresponding bin; or each dimension indicates a boundary value of the feature values of all continuous features that are assigned into the corresponding bin.

Specifically, the at least one additional operation may include an additional binning operation whose binning mode is same as that of the basic binning operation but whose binning parameter is different from that of the basic binning operation; or, the at least one additional operation may include the additional binning operation whose binning mode is different from that of the basic binning operation. The binning mode here includes various binning modes under the supervised binning and/or the unsupervised binning. For example, the supervised binning includes the minimum entropy binning, the minimum description length binning, etc. and the unsupervised binning includes the equal-width binning, the equal-depth binning, the k-means clustering based binning and so on.

As an example, the basic binning operation and the additional binning operation may correspond to equal-width binning operations with different widths, respectively. That is to say, the basic binning operation and the additional binning operation adopt the same binning mode but different granularity of division, which makes the generated basic binning feature and the additional binning feature better characterize the law of the original data record, thus it is more beneficial to the training and prediction of the machine learning model. In particular, the different widths adopted in the basic binning operation and the additional binning operation may constitute a geometric sequence in numerical values, for example, the basic binning operation may perform the equal-width binning in accordance with the width of the value 2, and the additional binning operations may perform the equal-width binning in accordance with the widths of the values 4, 8, 16 and the like. Alternatively, the different widths adopted in the basic binning operation and the additional binning operation may constitute an arithmetic sequence in numerical values, for example, the basic binning operation may perform the equal-width binning in accordance with the width of the value 2, and the additional binning operation may perform the equal-width binning in accordance with the widths of the values 4, 6, 8, and the like.

As another example, the basic binning operation and the additional binning operations may correspond to the equal depth binning operations with different depths, respectively. That is to say, the basic binning operation and the additional binning operation adopt the same binning method but different granularity of division, which makes it possible for the generated basic binning feature and the additional binning feature to better characterize the law of the original data record, thus it is more beneficial to the training and prediction of the machine learning model. In particular, the different depths adopted in the basic binning operation and the additional binning operation may constitute the geometric sequence in numerical values, for example, the basic binning operation may perform the equal-depth binning in accordance with the depth of the value 10, and the additional binning operation may perform the equal-depth binning in accordance with the depths of the values 100, 1000, 10000 and the like. Alternatively, the different depths adopted in the basic binning operation and the additional binning operation may constitute the arithmetic sequence in numerical values, for example, the basic binning operation may perform the equal-depth binning in accordance with the depth of the value 10, and the additional binning operation may perform the equal-depth binning in accordance with the depths of values 20, 30, 40, and the like.

According to an exemplary embodiment of the present invention, the additional operation may further include a non-binning operation, for example, the at least one additional operation includes at least one of following types of operations: a logarithmic operation, an exponential operation, an absolute value operation, and a Gaussian transformation operation. It should be noted that the additional operation herein is not limited to the type of operation and the operation parameters, and may adopt any suitable formula form, that is to say, the additional operation not only may have a simple form such as a square operation, but also may have a complex operation expression. For example, for the j-th value $x_{ij}$ of the i-th continuous feature, the additional operation may be performed on it according to the following formula to obtain an additional feature $x''_{ij}$:

$$x''_{ij} = \text{sign}(x_{ij}) \times \log_2(1+|x_{ij}|), \text{ wherein sign is a sign function.}$$

In addition to the basic binning feature and the additional feature described above, in step S200, other features included in the machine learning sample, which may be obtained through performing various feature processes such as discretization, field combination, extraction of a part of a field value, rounding, etc. on at least a portion of the attribute information of the data record by feature generation device 200 or other devices, may also be generated.

Next, continuing referring to FIG. 5, in step S300, the machine learning sample generation device 300 generates the machine learning sample at least including the generated basic binning feature and at least one additional feature. Here, the generated machine learning sample may include only the basic binning feature and the additional feature, and may further include other features. As an example, the generated machine learning sample may further include at least one of the continuous features generated based on the at least a portion of the attribute information, that is, at least one of the continuous features that have been subjected to the basic binning operation and the additional operation. The machine learning sample here may indicate a training sample or a prediction sample, and if it is the prediction sample under the supervised learning, in addition to the feature, a corresponding label portion shall be included.

According to an exemplary embodiment of the present invention, step S200 and step S300 may be performed in a memory under a distributed parallel computing framework, which may have distributed parameter servers.

Moreover, as an example, the generated machine learning sample may be used directly for a training process of the machine learning model and/or a prediction process of the machine learning model. In particular, the machine learning sample generation step according to an exemplary embodiment of the present invention may be considered as a part of the training and/or prediction process of the machine learning model, accordingly, there is no need for the machine learning sample to be explicitly saved in the hard disk, and this kind of processing method may significantly improve running speed compared with the conventional method.

Figure 6:
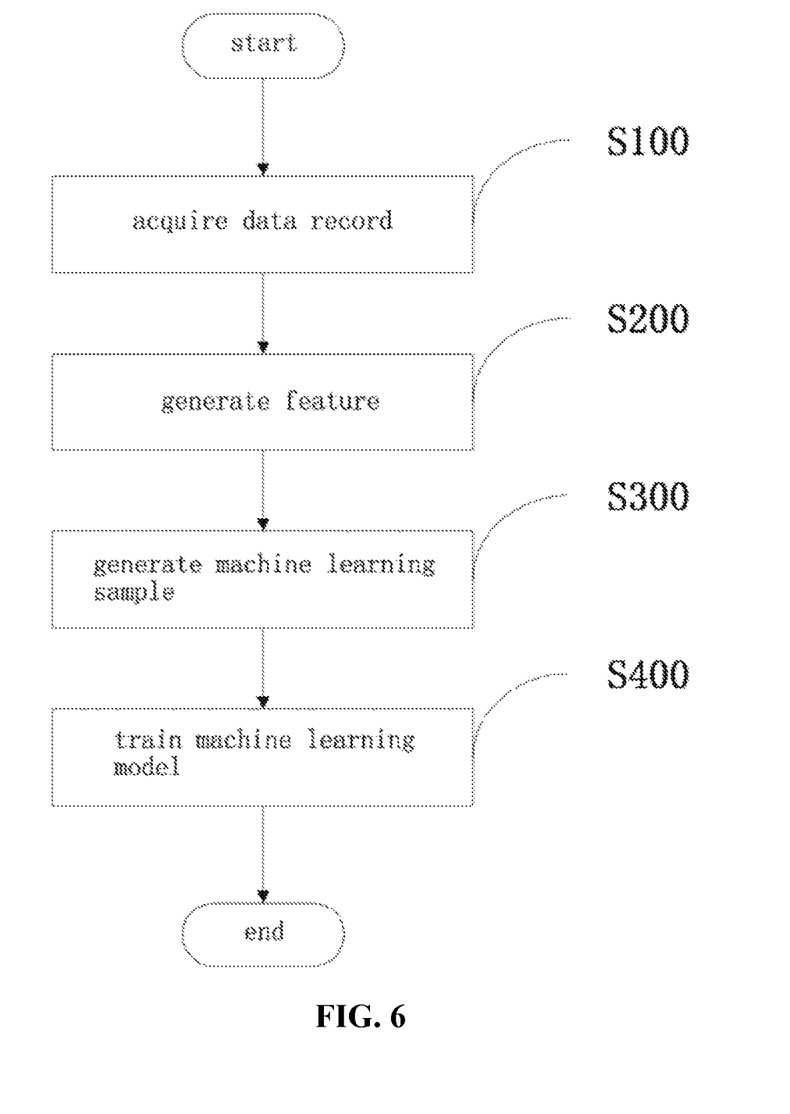
FIG. 6 illustrates a flowchart of a training method of the machine learning model according to an exemplary embodiment of the present invention.

FIG. 6 illustrates a flow chart of a training method of the machine learning model according to an exemplary embodiment of the present invention. In the method illustrated in FIG. 6, in addition to the above steps S100, S200, and S300, the method further includes step S400.

Specifically, in the method illustrated in FIG. 6, step S100 and step S200 may be similar to the corresponding steps illustrated in FIG. 5, except that in step S300, the machine learning training sample may be generated, in particular, as an example, in the case of the supervised learning, the generated machine learning training sample may include both the feature portion and the label portion.

In step S400, the machine learning model training device 400 may train the machine learning model based on the machine learning training sample. Here, the machine learning model training device 400 may obtain an appropriate machine learning model from the machine learning training samples using an appropriate machine learning algorithm (for example, the logarithmic probability regression).

In the above example, the machine learning model which is more stable and has a better prediction effect may be trained.

After the machine learning model is trained, a machine learning prediction may be performed using the feature processing method according to an exemplary embodiment of the present invention.

Figure 7:
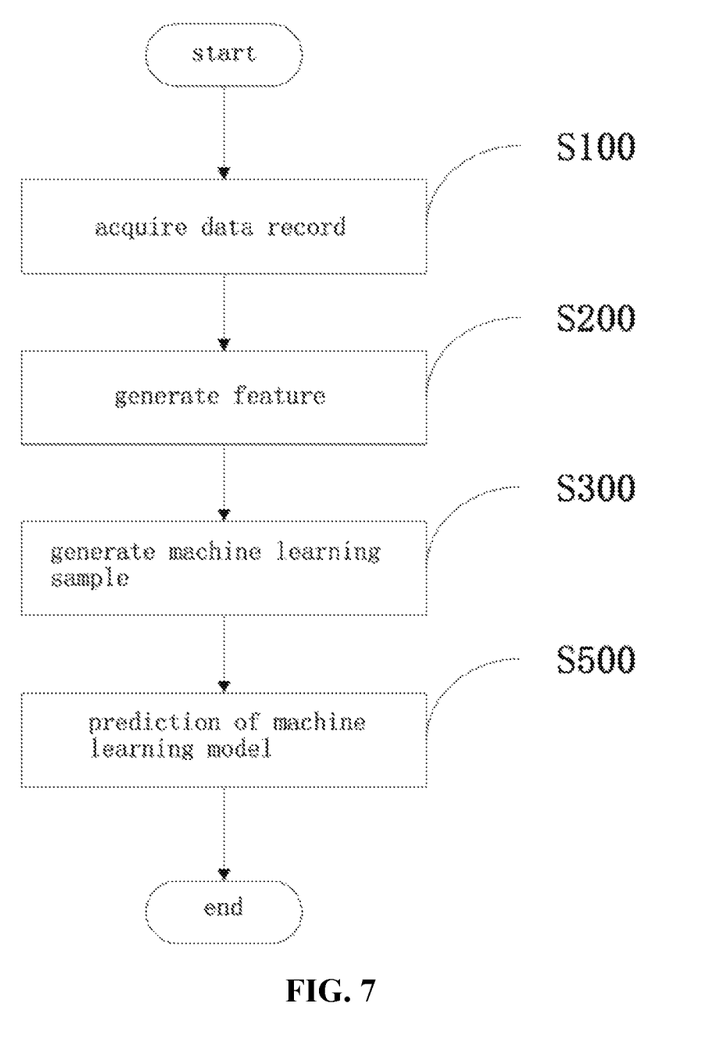
FIG. 7 illustrates a flowchart of a prediction method of the machine learning model according to an exemplary embodiment of the present invention.

FIG. 7 illustrates a flowchart of a prediction method of the machine learning model according to an exemplary embodiment of the present invention. In the method illustrated in FIG. 7, in addition to the above steps S100, S200, and S300, the method further includes step S500.

Specifically, in the method illustrated in FIG. 7, step S100 and step S200 may be similar to the corresponding steps illustrated in FIG. 5, except that in step S300, the machine learning prediction sample may be generated, here, feature portion of the machine learning prediction sample may be generated in a corresponding manner of generating the feature portion in the machine learning training sample.

In step S500, the machine learning model prediction device 500 may provide a prediction result corresponding to the machine learning prediction sample using the machine learning model. Here, the prediction result may be provided in batches for a plurality of machine learning prediction samples. Further, the machine learning model may be generated by the training method according to an exemplary embodiment of the present invention, or may be received from the outside.

It can be seen that in a feature processing scheme and a corresponding machine learning scheme according to an exemplary embodiment of the present invention, in addition to performing the basic binning operation, the additional operation is further performed for a single continuous feature, thereby obtaining the plurality of features including the binning feature, corresponding to the continuous feature, so that the features making up the machine learning sample are more effective, thereby improving the effect of the machine learning model.

Compared with a processing method of making the discrete features continuous, the above method reduces the loss of information, and furthermore may effectively characterize a nonlinear relationship between the feature and a predicted target. As an example, for some widely used linear models (for example, a logarithmic probability regression model), the above method will significantly improve effectiveness of the model.

Alternatively, in an exemplary embodiment of the present invention, a plurality kinds of binning operations that differ in the binning mode and/or the binning parameters may be further performed, thereby improving the effect of the model on the one hand, and reducing ability/energy required to manually extract a nonlinear feature or adjust the parameter on the other hand, so that the doorsill of applying the machine learning is lowed.

It should be noted that the feature processing device and the corresponding model training/prediction system described above may implement corresponding functions completely depend on the operation of a computer program, that is, each device corresponds to each step in functional structure of the computer program, so that the entire system is called by a special software package (for example, a lib library) to implement a corresponding function.

On the other hand, respective devices illustrated in FIG. 1 to FIG. 4 may also be implemented by hardware, software, firmware, middleware, microcode, or any combination thereof. When implemented in the software, the firmware, the middleware or the microcode, program codes or code segments for performing a corresponding operation may be stored in a computer readable medium, such as a storage medium, such that a processor may perform the corresponding operation by reading and executing the corresponding program codes or code segments.

Here, an exemplary embodiment of the present invention may also be implemented as a computing device including a storage component in which a set of computer-executable instructions is stored, and a processor, wherein when the set of the computer-executable instructions is executed by the processor, the above-described feature processing method and the machine learning method are executed.

Specifically, the computing device may be deployed in a server or a client, or may be deployed on a node device in a distributed network environment. Moreover, the computing device may be a PC computer, a tablet device, a personal digital assistant, a smart phone, a web application, or other device capable of executing the set of the instructions described above.

Here, the computing device does not have to be a single computing device, but may be any integration of devices or circuits capable of executing the above-described instructions (or the set of the instructions), either alone or in combination. The computing device may also be part of an integrated control system or system manager, or may be configured as a portable electronic device interfaced locally or remotely (e.g., via wireless transmission).

In the computing device, the processor may include a central processing unit (CPU), a graphics processing unit (GPU), a programmable logic device, a dedicated processor system, a microcontroller, or a microprocessor. As an example rather than limitation, the processor may also include an analog processor, a digital processor, a microprocessor, a multi-core processor, a processor array, a network processor, and the like.

Some operations described in the above feature processing method and/or machine learning method may be implemented in software, some operations may be implemented in hardware, and in addition, these operations may be implemented by a combination of the hardware and the software.

The processor may execute instructions or codes stored in one of storage components, wherein the storage components may also store data. The instructions and the data may also be transmitted and received through a network via a network interface device, which may employ any known transmission protocol.

The storage component may be integrated with the processor, for example, a RAM or a flash memory is arranged within an integrated circuit microprocessor or the like. In addition, the storage component may include a separate device such as an external disk driver, a storage array, or other storage device that may be used by any database system. The storage component and the processor may be operatively coupled or may be in communication with each other, such as through an I/O port, a network connection, etc., such that the processor may read files stored in the storage component.

Moreover, the computing device may also include a video display (such as a liquid crystal display) and a user interaction interface (such as a keyboard, a mouse, a touch input device, etc.). All components of the computing device may be connected to each other via a bus and/or a network.

The operations involved in the above feature processing method and/or machine learning method may be described as various interconnected or coupled functional blocks or functional diagrams. However, these functional blocks or functional diagrams may be equally integrated into a single logical device or operated in a non-exact boundary.

In particular, as described above, a computing device for performing feature processing for the machine learning according to an exemplary embodiment of the present invention includes a storage component in which a set of computer-executable instructions is stored, and a processor, wherein when the set of the computer-executable instructions is executed by the processor, following steps are performed: (A) acquiring a data record comprising at least one attribute information; (B) performing a basic binning operation and at least one additional operation with respect to each of continuous features generated based on at least a portion of the at least one attribute information, to generate a basic binning feature and at least one additional feature corresponding to the each of the continuous features; and (C) generating a machine learning sample at least comprising the generated basic binning feature and the at least one additional feature It should be noted that various processing details of the feature processing method for the machine learning according to an exemplary embodiment of the present invention have been described above with reference to FIG. 5 to FIG. 7, thus, the processing details when the computing device executes respective steps will not be described herein.

Various embodiments of the present invention have been described above. It should be understood that the above description is exemplary, not exhaustive, and the present invention is not limited to the disclosed respective embodiment. Many modifications and variations will be obvious to those of ordinary skill in the art without departing from the scope and spirit of the present invention. Therefore, the scope of the present invention should depend on the scope of claims.

What is claimed is:

1. A feature processing method for machine learning, comprising:

acquiring text information data;

obtaining a data record by analyzing and converting the text information data, wherein the data record comprises at least one attribute information;

generating a plurality of continuous features based on at least a portion of the at least one attribute information;

performing a basic binning operation and at least one additional operation with respect to each of the plurality of continuous features to generate a basic binning feature and at least one additional feature corresponding to the each of the plurality of continuous features, wherein the at least one additional operation is different from the basic binning operation;

generating a machine learning sample at least comprising the generated basic binning feature and the at least one additional feature; and training an untrained machine learning model based on the machine learning sample or making a prediction by using a trained machine learning model based on the machine learning sample.

2. The feature processing method according to claim 1, wherein the at least one additional operation comprises at least one of following types of operations: a logarithmic operation, an exponential operation, an absolute value operation, and a Gaussian transformation operation.

3. The feature processing method according to claim 1, wherein the at least one additional operation comprises an additional binning operation whose binning mode is same as that of the basic binning operation but whose binning parameter is different from that of the basic binning operation; or, the at least one additional operation comprises the additional binning operation whose binning mode is different from that of the basic binning operation.

4. The feature processing method according to claim 3, wherein the binning mode comprises the binning mode under supervised binning and/or unsupervised binning.

5. The feature processing method according to claim 3, wherein the basic binning operation and the additional binning operation respectively correspond to equal-width binning operations with different widths, or equal-depth binning operations with different depths.

6. The feature processing method according to claim 5, wherein the different widths or the different depths constitute a geometric sequence or an arithmetic sequence in numerical values.

7. The feature processing method according to claim 3, wherein the basic binning feature and/or the additional binning feature are with a plurality of dimensions, corresponding to the each of the continuous features, wherein each dimension indicates whether a corresponding continuous feature is assigned into a corresponding bin; or each dimension indicates a feature value of the corresponding continuous feature that is assigned into the corresponding bin; or each dimension indicates an average value of the feature values of all continuous features that are assigned into the corresponding bin; or each dimension indicates an intermediate value of the feature values of all continuous features that are assigned into the corresponding bin; or each dimension indicates a boundary value of the feature values of all continuous features that are assigned into the corresponding bin.

8. The feature processing method according to claim 3, wherein the step of performing the basic binning operation and/or the additional binning operation comprises: additionally setting an outlier bin, so that the continuous feature with an outlier value is assigned into the outlier bin.

9. The feature processing method according to claim 1, wherein the machine learning sample further comprises at least one of the continuous features generated based on the at least a portion of the at least one attribute information.

10. A computing device for performing a feature processing for machine learning, comprising a storage component in which a set of computer-executable instructions is stored, and a processor, wherein when the set of the computer-executable instructions is executed by the processor, following steps are performed:

acquiring text information data;

obtaining a data record by analyzing and converting the text information data, wherein the data record comprises at least one attribute information;

generating a plurality of continuous features based on at least a portion of the at least one attribute information;

performing a basic binning operation and at least one additional operation with respect to each of the plurality of continuous features to generate a basic binning feature and at least one additional feature corresponding to the each of the continuous features, wherein the at least one additional operation is different from the basic binning operation;

generating a machine learning sample at least comprising the generated basic binning feature and at least one additional feature; and training an untrained machine learning model based on the machine learning sample or making a prediction by using a trained machine learning model based on the machine learning sample.

11. The computing device according to claim 10, wherein the at least one additional operation comprises at least one of following types of operations: a logarithmic operation, an exponential operation, an absolute value operation, and a Gaussian transformation operation.

12. The computing device according to claim 10, wherein the at least one additional operation comprises an additional binning operation whose binning mode is same as that of the basic binning operation but whose binning parameter is different from that of the basic binning operation; or, the at least one additional operation comprises the additional binning operation whose binning mode is different from that of the basic binning operation.

13. The computing device according to claim 12, wherein the binning mode comprises the binning mode under supervised binning and/or unsupervised binning.

14. The computing device according to claim 12, wherein the basic binning operation and the additional binning operation respectively correspond to equal-width binning operations with different widths, or equal-depth binning operations with different depths.

15. The computing device according to claim 14, wherein the different widths or the different depths constitute a geometric sequence or an arithmetic sequence in numerical values.

16. The computing device according to claim 12, wherein the basic binning feature and/or the additional binning feature are with a plurality of dimensions, corresponding to the each of the continuous features, wherein each dimension indicates whether a corresponding continuous feature is assigned into a corresponding bin; or each dimension indicates a feature value of the corresponding continuous feature that is assigned into the corresponding bin; or each dimension indicates an average value of the feature values of all continuous features that are assigned into the corresponding bin; or each dimension indicates an intermediate value of the feature values of all continuous features that are assigned into the corresponding bin; or each dimension indicates a boundary value of the feature values of all continuous features that are assigned into the corresponding bin.

17. The computing device according to claim 12, wherein the step of performing the basic binning operation and/or the additional binning operation comprises: additionally setting an outlier bin, so that the continuous feature with an outlier value is assigned into the outlier bin.

18. The computing device according to claim 10, wherein the machine learning sample further comprises at least one of the continuous features generated based on the at least a portion of the at least one attribute information.

19. A computer storage medium storing instructions that when executed by a processor causes the processor to perform operations comprising:
    acquiring text information data;
    obtaining a data record by analyzing and converting the text information data, wherein the data record comprises at least one attribute information;
    generating a plurality of continuous features based on at least a portion of the at least one attribute information;
    performing a basic binning operation and at least one additional operation with respect to each of the plurality of continuous features to generate a basic binning feature and at least one additional feature corresponding to the each of the continuous features, wherein the at least one additional operation is different from the basic binning operation;
    generating a machine learning sample at least comprising the generated basic binning feature and the at least one additional feature; and
    training an untrained machine learning model based on the machine learning sample or making a prediction by using a trained machine learning model based on the machine learning sample.

* * * * *